Sept. 9, 1958

H. KAMMERER 2,850,985

DEFORMATION COMPENSATING SUPPORTING
ARRANGEMENT FOR ROTARY MACHINES

Filed Feb. 1, 1956

INVENTOR
Helmut Kammerer
BY Michael S. Striker
ATTORNEY

United States Patent Office 2,850,985
Patented Sept. 9, 1958

2,850,985

DEFORMATION COMPENSATING SUPPORTING ARRANGEMENT FOR ROTARY MACHINES

Helmut Kammerer, Oberhausen-Sterkrade, Rhineland, Germany, assignor to Gutehoffnungsschütte Sterkrade Aktiengesellschaft, Oberhausen-Sterkrade, Germany Application February 1, 1956, Serial No. 562,874

Claims priority, application Germany February 3, 1955

11 Claims. (Cl. 103—126)

The present invention refers to a deformation compensating supporting arrangement for rotary machines, and more particularly to an arrangement for connecting the housing and the rotor supports of the machine in such a manner that the housing can be deformed without causing binding of the rotors in the housing.

Pumps and fluid-operated rotary engines require a very narrow gap between the rotor and the housing in order to keep the leakage losses small. This is particularly true for machines employing two cooperating rotors of the lobe type, since not only the housing, but also the two rotors must have a small gap since the rotors must seal each other. In machines of this type, great temperature differences occur between the inlet and the outlet for the operating fluid, and consequently the housing is deformed since the influence of the heated operating fluid is different at different housing portions. According to the prior art, the supports for the rotor bearings are rigidly connected to the housing. Consequently, when the housing is deformed under the influence of the uneven heat distribution, the rotors may bind in the housing. A housing axis which coincides with the rotor axis in cool condition of the housing, is deformed into an arcuate shape so that particularly the center portion of the housing axis moves to a position transversely spaced from the associated rotor axis.

The inlet means and outlet means for the operating fluid are conventionally arranged on opposite sides of the housing, causing different pressures on the respective sides of the housing whereby the rotor axis is further resiliently deformed and the distance between the housing axis and the associated rotor axis further increased.

It is one object of the present invention to overcome the disadvantages of the constructions of the known art, and to provide an arrangement in which the housing and the rotor supports are connected in such a manner that no binding between the housing and the rotor can take place even if the housing is deformed.

It is another object of the present invention to provide an arrangement in which the rotor, or rotors, and the housing of a fluid-operated machine are connected in such a manner that at least the center portions of the housing axis and of the associated rotor axis coincide when the housing is deformed.

It is another object of the present invention to connect the center portion of the housing to the bearings supporting the rotor so that the ends of the housing are free to move when the housing is deformed by uneven thermal expansion.

It is a further object of the present invention to connect the housing with the rotor, or rotors, by first means which are resilient in one plane and rigid in a perpendicular plane, and by second means which are resilient in the last mentioned perpendicular plane and rigid in the first mentioned plane.

The principle of the present invention may be advantageously applied to machines having one rotor, or two cooperating rotors. With the above objects in view, the present invention mainly consists in an arrangement which comprises rotor means having at least one rotor axis, supports for supporting the rotor means for rotation about the rotor axis, housing means enveloping the rotor means and adapted to contain an operating fluid which is partly heated during rotation of the rotor means whereby the housing means is deformed, and means secured to the housing means and to the supports for holding the housing means and the rotor means in a position in which the housing axis and the associated rotor axis substantially coincide at the center portion of the housing means in normal and deformed conditions of the housing means while the ends of the housing are free to move when the housing means is deformed.

According to a preferred embodiment of the present invention, a pair of elongated means are secured at the ends thereof to the supports and at the centers thereof to the center portions of the housing means. Due to this arrangement, the ends of the housing are free to move, while the center portion is held in the desired position with respect to the axis of the rotor means. Preferably, resilient means are arranged between the ends of the housing means and the supports. High pressure passage means and low pressure passage means are arranged in a plane, and since the temperature of the fluid in the housing is greater in the region of the high pressure passage means, the housing will be mainly deformed in the last mentioned plane. Consequently, the elongated means which are secured to the supports and to the center portion of the housing, are rigid in the direction of the plane mentioned above, and are resilient in a plane transverse thereto. The other resilient means which are arranged between the housing means and the supports are resilient in the direction of the above mentioned plane, and rigid in a transverse direction. In the embodiment of the present invention in which two cooperating rotors are provided, the rotor axes are located in a plane transverse to the above mentioned plane defined by the inlet and outlet means on the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
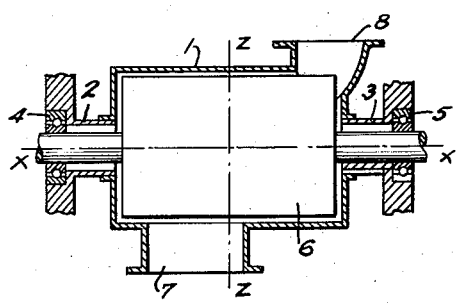
Fig. 1 is an axial sectional view of a machine according to the prior art.
Figure 2:
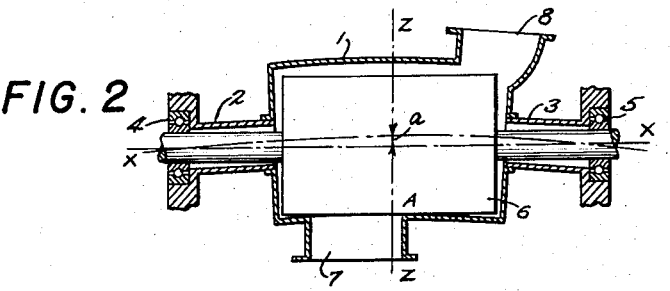
Fig. 2 is an axial sectional view of the machine shown in Fig. 1 in which the housing is shown in deformed condition.

Referring now to the drawings, and more particularly to Figs. 1 and 2 which illustrate an arrangement according to the prior art, the housing 1 of a rotary machine such as a pump or fluid-operated engine of the type in which two rotors are provided, is connected by tubular rigid members 2 and 3 to the supports 4 and 5 in which the rotor, or rotors, 6 are mounted for rotation. A gap of uniform width is provided between the rotor, or rotors, and the housing, and such gap is designed for a condition of the housing in which the housing axis coincides with the associated rotor axis. The housing is provided with a low pressure passage means 7 and with a high pressure passage means 8, and since the operating fluid is heated in the region of the high pressure passage means 8, the housing is heated to a greater extent in its upper portion than in its lower portion and assumes the deformed condition illustrated in Fig. 2. Referring only to one housing axis and to the associated rotor axis, the deformation of the housing 1 will result in a relative position between the rotor and the housing in which the housing axis is spaced a distance $a$ from the rotor axis in the region of the center portion of the housing. The effect of the deformation of the housing is increased by the rigid tubular portions 2 and 3. Since the housing 1 is raised in the deformed condition shown in Fig. 2, whereas the rotor remains substantially in the same position, a binding between the housing and the rotor takes place in the region A.

Figure 4:
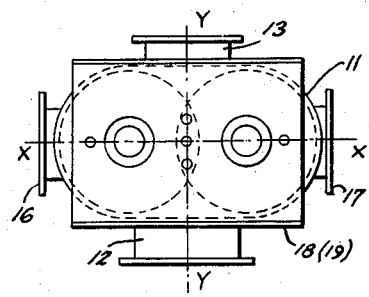
Fig. 4 is an end view of the embodiment shown in Fig. 3.
Figure 3:
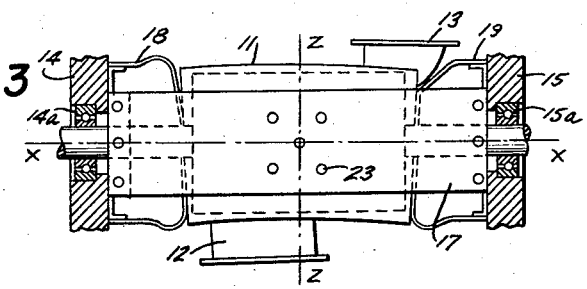
Fig. 3 is a side view of an arrangement according to the present invention, partly shown in section.
Figure 5:
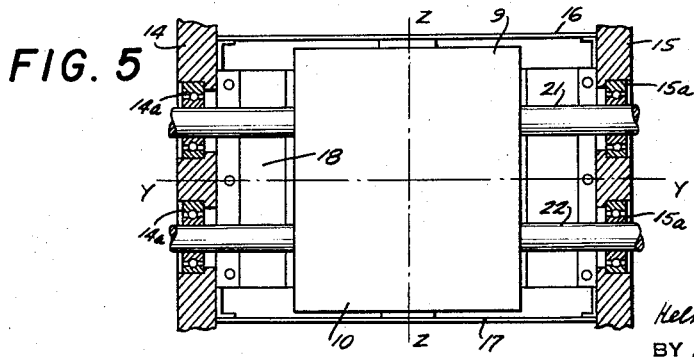
Fig. 5 is a plan view of the embodiment shown in Figs. 3 and 4, partly in section.

Referring now to Figs. 3, 4 and 5, which illustrate an embodiment of the present invention, the housing 11 envelopes two cooperating rotors 9 and 10, which are respectively supported on shafts 21 and 22. Supports 14 and 15 are arranged spaced from the ends of the housing 11, and include bearings 15a and 14a in which the rotor shafts 22 and 21 are mounted. The center portion of the housing 11 is located in the region of a vertical transverse plane ZZ and connected by rivets or bolts 23 to the center portions of two elongated members 16 and 17 whose ends are fixedly secured to the supports 14 and 15. The elongated members 16 and 17 are located spaced from each other in the horizontal second plane XX defined by the two rotor axes of the rotors 9 and 10. The high pressure passage means 13 and the low pressure passage means 12 are arranged in a vertical longitudinal first plane YY perpendicular to the planes XX and ZZ and extending in direction of the rotor and housing axes. Consequently, the housing 11 is heated to a greater extent in its upper portion, curves in the plane YY and assumes the deformed condition illustrated in Fig. 3. The elongated leaf springs 16 and 17 are each located in a plane parallel to the plane YY have such cross section as to be rigid in a direction parallel to the plane YY defined by the passage means 12 and 13 and to be resilient in the plane XX. Between the ends of the housing 11 and the supports 14 and 15 are arranged two resilient means 18 and 19 which are preferably substantially U-shaped leaf springs. As is clearly shown in Fig. 3, the ends of the legs of resilient means 18 and 19 are secured to the supports 14 and 15, whereas the yoke portions of the resilient means 18 and 19 are secured to the ends of the housing 11. It will be understood, that the resilient means 18 and 19 are rigid in the direction of the plane XX, and resilient in the vertical plane YY in which deformation of the housing take place. The three perpendicular planes XX, YY and ZZ are indicated in Figs. 3, 4 and 5 at the lines in which the respective plane intersects the plane of the drawing.

It will be apparent that the relative position between the two housing axes and the two rotor axes in the region of the center of the housing and in the plane XX will remain unchanged even if the housing 11 is deformed in the plane YY as shown in Fig. 3. Since the center of the housing 11 is rigidly supported in the plane ZZ by members 16, 17, the deformation of the housing in plane YY caused by the uneven temperature of the fluid in the housing will result in displacement of the ends of the housing, such displacement being possible since the resilient means 18 and 19 will give freely. A lateral expansion of the housing 11 in the plane XX will be taken up by the laterally resilient means 16 and 17.

In the arrangement according to the present invention the gap distance remains substantially unchanged in the region of the plane ZZ, that is at a point equally spaced from the ends of the housing. In the region of the ends of the housing, the gap will be reduced in the upper housing portion and increased at the lower housing portion. An engagement between the rotor ends and the housing ends can only take place if the ends of the housing are deformed to an extent corresponding to the originally provided gap width. Such occurrence, however, is unlikely, since the heat deformation will not amount to such great value. As compared with the arrangement of the known art shown in Fig. 2, the additional displacement caused by the rigid tubular portions 3 is avoided in the construction of the present invention.

In pump and fluid-operated engines of the type to which the present invention is advantageously applied, there is a pressure difference between the inlet means and the outlet means. Moreover, the weight of the rotors will cause a slight bending of the rotor shafts in planes parallel to plane YY resulting in curved rotor axes. While the influence of these facts is only slight, it may be considered in the arrangement of the present invention. The elongated members 16 and 17 are arranged in such a manner that the supports 14 and 15 do not support the rotors in a position in which the plane of the two housing axes coincides with the plane of the two rotor axes in normal cold condition of the housing. The rotors 9 and 10 are mounted a little higher, and consequently during the operation of the machine, the housing is curved in plane YY in a direction opposite to the curvature of the rotors and rotor shafts in planes parallel to plane YY caused by the uneven pressure and by the weight of the rotors. In this arrangement each housing axis between bearings 14a, 15a intersects at two spaced points with the associated rotor axis. Consequently, the relative displacement between the housing axes and the associated rotor axes in the region of the housing ends is even smaller than in the previously described arrangement.

It will be understood that each of the elements described above, or two or more together, may also find a useful application in other types of pumps and fluid-operated machines differing from the types described above.

While the invention has been illustrated and described as embodied in a deformation compensating supporting arrangement for rotary machines, of the type employing two cooperating lobe type rotors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus of the type described, comprising in combination, rotor means having at least one rotor axis; two supports for supporting said rotor means for rotation about said rotor axis; housing means enveloping said rotor means and adapted to contain a fluid which is partly heated during rotation of said rotor means whereby said housing means is deformed, said housing means having at least one housing axis and ends spaced from said supports; first resilient means being resilient in a first plane passing through said housing axis and being rigid in a second plane perpendicular to said first plane, and second resilient means being resilient in said second plane and being rigid in said first plane, said first and second resilient means being secured to said housing means and to said supports, and one of said resilient means being secured to the center portion of said housing means for rigidly holding the center portion of said housing means and said rotor means in a position in which said housing axis and said rotor axis substantially coincide at the center portion of said housing means in normal condition and in deformed condition of said housing means while the ends of said housing means are free to move relative to said supports when said housing means is deformed.

2. An apparatus of the type described, comprising in combination, rotor means having at least one rotor axis; two supports for supporting said rotor means for rotation about said rotor axis; housing means enveloping said rotor means and adapted to contain a fluid which is partly heated during rotation of said rotor means whereby said housing means is deformed in a first plane, said housing means having at least one housing axis and ends spaced from said supports; two resilient means respectively secured to said supports and to said ends of said housing means and being resilient in direction of said first plane passing through said housing axis and being rigid in a second plane perpendicular to said first plane, and two elongated means being rigid in said first plane, each of said elongated means being secured to the center portion of said housing means and having ends respectively secured to said supports, said elongated means holding said center portion of said housing means and said rotor means in a position in which said housing axis and said rotor axis substantially coincide at the center portion of said housing means in normal condition and in deformed condition of said housing means, said resilient means yielding in said first plane when said ends of said housing means are displaced in deformed condition of said housing means.

3. An apparatus of the type described, comprising in combination, rotor means having at least one rotor axis; two supports for supporting said rotor means for rotation about said rotor axis; housing means enveloping said rotor means and adapted to contain a fluid which is partly heated during rotation of said rotor means whereby said housing means is deformed in a first plane passing through said housing axis, said housing means having at least one housing axis and ends spaced from said supports; first resilient means being resilient in said first plane passing through said housing axis and being rigid in a second plane perpendicular to said first plane, and second resilient means being resilient in said second plane and being rigid in said first plane, said first and second resilient means being secured to said housing means and to said supports, and said second resilient means being secured to said center portion of said housing means for rigidly holding the center portion of said housing means and said rotor means in a position in which said housing axis and said rotor axis substantially coincide at the center portion of said housing means in normal condition and in deformed condition of said housing means while the ends of said housing means are free to move relative to said supports when said housing means is deformed.

4. An apparatus of the type described, in combination, rotor means having at least one rotor axis; two supports for supporting said rotor means for rotation about said rotor axis; housing means enveloping said rotor means and having inlet and outlet means located in a first plane extending in direction of said rotor axis, said housing means being adapted to contain an operating fluid which is heated in the region of said outlet means during rotation of said rotor means whereby said housing means is deformed in said first plane, said housing means having at least one housing axis and ends spaced from said supports; first resilient means being resilient in said first plane and being rigid in a second plane perpendicular to said first plane, and second resilient means being resilient in said second plane and being rigid in said first plane, said first and second resilient means being secured to said housing means and to said supports, and said second resilient means being secured to said center portion of said housing means for rigidly holding the center portion of said housing means and said rotor means in a position in which said housing axis and said rotor axis substantially coincide at the center position of said housing means in normal condition and in deformed condition of said housing means while the ends of said housing means are free to move relative to said supports when said housing means is deformed.

5. In an apparatus of the type described, in combination, rotor means having at least one rotor axis; two supports for supporting said rotor means for rotation about said rotor axis; housing means enveloping said rotor means and having high pressure and low pressure passage means located in a first plane extending in direction of said rotor axis, said housing means being adapted to contain an operating fluid which is heated in the region of said high pressure passage means during rotation of said rotor means whereby said housing means is deformed to curve mainly in said first plane, said housing means having at least one housing axis and a pair of ends respectively spaced from said supports; and elongated means secured to said housing means at a portion of the same which is equally spaced from said ends of said housing means, said elongated means being rigid in said first plane, said elongated means being secured to said supports for holding said housing means and said rotor means in a position in which said housing axis and said rotor axis coincide at a region equally spaced from said ends of said housing means in normal condition and in deformed condition of said housing means while the ends of said housing means are free to move relative to said supports when said housing means is deformed.

6. In an apparatus of the type described, in combination, rotor means having at least one rotor axis; two supports for supporting said rotor means for rotation about said rotor axis; housing means enveloping said rotor means and having high pressure and low pressure passage means located in a first plane extending in direction of said rotor axis, said housing means being adapted to contain an operating fluid which is heated in the region of said high pressure passage means during rotation of said rotor means whereby said housing means is mainly deformed in said first plane, said housing means having at least one housing axis and a pair of ends respectively spaced from said supports; a pair of first resilient means located, respectively, on opposite sides of said housing means spaced from each other in a second plane perpendicular to said first plane, each of said first resilient means being secured at the ends thereof to said supports and at the center thereof to said housing means at a housing portion which is equally spaced from said ends of said housing means, each of said first resilient means being rigid in a direction parallel to said said first plane and being resilient in said second plane; and a pair of second resilient means each of said second resilient means being secured to one of said supports and to one of said ends of said housing means, said second resilient means being resilient in said first plane and being rigid in said second plane, said first and second resilient means holding said housing means and said rotor means in a position in which said housing axis and said rotor axis coincide at a region equally spaced from said ends of said housing means in normal condition and in deformed condition of said housing means while the ends of said housing means are free to move relative to said supports when said housing means is deformed.

7. In an apparatus of the type described, in combination, rotor means having at least one rotor axis; two supports for supporting said rotor means for rotation about said rotor axis; housing means enveloping said rotor means and adapted to contain an operating fluid which is partly heated during rotation of said rotor means whereby said housing means is deformed to curve mainly in a first plane, said housing means having at least one housing axis and a pair of ends respectively spaced from said supports; a pair of resilient leaf springs located, respectively, on opposite sides of said housing means spaced from each other in a second plane perpendicular to said first plane, each of said resilient leaf springs being located in a plane parallel to said first plane and being secured at the ends thereof to said supports and at the center thereof to said housing means at a housing portion which is equally spaced from said ends of said housing means, each of said resilient leaf springs being rigid in a direction parallel to said said first plane and being resilient in said second plane; and a pair of U-shaped resilient means, each secured at the ends thereof to one of said supports and at the center portion thereof to one of said ends of said housing means, said resilient means being resilient in said first plane and being rigid in said second plane, said leaf springs and said U-shaped resilient means holding said housing means and said rotor means in a position in which said housing axis and said rotor axis coincide at a region equally spaced from said ends of said housing means in normal condition and in deformed condition of said housing means, said resilient means yielding in said first plane when said ends of said housing means are displaced in deformed condition of said housing means.

8. In an apparatus of the type described, in combination, rotor means having at least one rotor axis; two supports for supporting said rotor means for rotation about said rotor axis; housing means enveloping said rotor means and having high pressure and low pressure passage means located in a first plane, said housing means being adapted to contain an operating fluid which is heated in the region of said high pressure passage means during rotation of said rotor means whereby said housing means is deformed to curve in said first plane, said housing means having at least one housing axis and a pair of ends respectively spaced from said supports; a pair of resilient leaf springs located, respectively, on opposite sides of said housing means spaced from each other in a second plane perpendicular to said first plane, each of said resilient leaf springs being located in a plane parallel to said first plane and being secured at the ends thereof to said supports and at the center thereof to said housing means at a housing portion which is equally spaced from said ends of said housing means, each of said resilient leaf springs being rigid in a direction parallel to said said first plane and being resilient in said second plane; and a pair of U-shaped resilient means, each of said U-shaped resilient means being secured at the ends thereof to one of said supports and at the center portion thereof to one of said ends of said housing means, said resilient means being resilient in said first plane and being rigid in said second plane, said leaf springs and said U-shaped resilient means holding said housing means and said rotor means in a position in which said housing axis and said rotor axis coincide at a region equally spaced from said ends of said housing means in normal condition and in deformed condition of said housing means, said resilient means yielding in said first plane when said ends of said housing means are displaced in deformed condition of said housing means.

9. In an apparatus of the type described, in combination, rotor means having at least one rotor axis; two supports for supporting said rotor means for rotation about said rotor axis; housing means enveloping said rotor means and having high pressure and low pressure passage means located in a first vertical plane, said housing means being adapted to contain an operating fluid which is heated in the region of said high pressure passage means during rotation of said rotor means whereby said housing means is deformed to curve in said first plane, said housing means having at least one housing axis and a pair of ends respectively spaced from said supports; a pair of resilient leaf springs located, respectively, on opposite sides of said housing means spaced from each other in a second plane perpendicular to said first plane, each of said resilient leaf springs being located in a plane parallel to said first plane and being secured at the ends thereof to said supports and at the center thereof to said housing means at a housing portion which is equally spaced from said ends of said housing means, each of said resilient leaf springs being rigid in a direction parallel to said said first plane and being resilient in said second plane; and a pair of U-shaped resilient means, each of said U-shaped resilient means being secured at the ends thereof to one of said supports and at the center portion thereof to one of said ends of said housing means, said resilient means being resilient in said first plane and being rigid in said second plane, said leaf springs and said U-shaped resilient means holding said housing means and said rotor means in a position in which said housing axis and said rotor axis coincide at a region equally spaced from said ends of said housing means in normal condition and in deformed condition of said housing means, said resilient means yielding in said first plane when said ends of said housing means are displaced in deformed condition of said housing means.

10. In an apparatus of the type described, in combination, a pair of cooperating rotor means having parallel axes of rotation located in a horizontal plane; two supports for supporting said pair of rotor means for rotation about said rotor axes; housing means enveloping said rotor means and having high pressure passage means located on one side of said horizontal plane and low pressure passage means located on the other side of said horizontal plane, said housing means being adapted to contain an operating fluid which is heated in the region of said high pressure passage means during rotation of said pair of rotor means whereby said housing means is deformed to curve mainly in a vertical plane extending in direction of said rotor axes, said housing means having a pair of housing axes located in said horizontal plane and a pair of ends respectively spaced from said supports in axial direction; first elongated resilient means located, respectively, on opposite sides of said housing means spaced from each other in said horizontal plane, each of said first resilient means being secured at the ends thereof to said supports and at the center thereof to said housing means at a housing portion which is equally spaced from said ends of said housing means, each of said first resilient means being rigid in vertical direction and being resilient in horizontal direction; and a pair of second resilient means, each of said second resilient means being secured to one of said supports and to one of said ends of said housing means, said second resilient means being resilient in said vertical plane, and being rigid in said horizontal plane, said first and second resilient means supporting said housing means in a position in which said housing axes and said rotor axes, respectively, coincide at points equally spaced from said ends of said housing means in normal condition and in deformed condition of said housing means while the ends of said housing means are free to move relative to said supports when said housing means is deformed.

11. In an apparatus of the type described, in combination, a pair of cooperating rotor means having parallel axes of rotation located in a horizontal plane; two supports for supporting said pair of rotor means for rotation about said rotor axes; housing means enveloping said rotor means and having high pressure passage means located on one side of said horizontal plane and low pressure passage means located on the other side of said horizontal plane, said housing means being adapted to contain an operating fluid which is heated in the region of said high pressure passage means during rotation of said pair of rotor means whereby said housing means is deformed to curve mainly in a vertical plane extending in direction of said rotor axes, said housing means having a pair of housing axes located in said horizontal plane and a pair of ends respectively spaced from said supports in axial direction; first elongated resilient means located, respectively, on opposite sides of said housing means spaced from each other in said horizontal plane, each of said first resilient means being secured at the ends thereof to said supports and at the center thereof to said housing means at a housing portion which is equally spaced from said ends of said housing means, each of said first resilient means being rigid in vertical direction and being resilient in horizontal direction; and a pair of U-shaped second resilient means, each of said U-shaped second resilient means having leg portions secured at the ends thereof to one of said supports and having a yoke portion secured to one of said ends of said housing means, said second resilient means being resilient in said vertical plane, and being rigid in said horizontal plane, said first and second resilient means supporting said housing means in a position in which said housing axes and said rotor axes, respectively, coincide at points equally spaced from said ends of said housing means in normal condition and in deformed condition of said housing means while the ends of said housing means are free to move relative to said supports when said housing means is deformed.

References Cited in the file of this patent

UNITED STATES PATENTS

| | | |
|---|---|---|
| 2,463,460 | Hodgkinson | Mar. 1, 1949 |
| 2,466,888 | Garraway | Apr. 12, 1949 |
| 2,504,230 | Smith | Apr. 18, 1950 |
| 2,592,476 | Sennet | Apr. 8, 1952 |
| 2,627,161 | Lindhagen et al. | Feb. 3, 1953 |
| 2,640,430 | Sennet | June 2, 1953 |
| 2,652,192 | Chilton | Sept. 15, 1953 |
| 2,714,857 | Albright et al. | Aug. 9, 1955 |
| 2,750,895 | Sturm | June 19, 1956 |
| 2,755,990 | Nilsson et al. | July 24, 1956 |

FOREIGN PATENTS

| | | |
|---|---|---|
| 894,811 | Germany | Oct. 29, 1953 |